US006935695B2

(12) United States Patent
Carta Gonzalez et al.

(10) Patent No.: US 6,935,695 B2
(45) Date of Patent: Aug. 30, 2005

(54) PORTABLE TRAVELLER HEADREST

(75) Inventors: Jose Antonio Carta Gonzalez, Las Palmas (ES); Gerardo Garces Martin, Las Palmas (ES)

(73) Assignee: Veme, S.A., Belize (BZ)

( * ) Notice: Subject to any disclaimer, the term of this patent is extended or adjusted under 35 U.S.C. 154(b) by 36 days.

(21) Appl. No.: 10/480,516

(22) PCT Filed: Jun. 12, 2002

(86) PCT No.: PCT/ES02/00291

§ 371 (c)(1),
(2), (4) Date: Dec. 15, 2003

(87) PCT Pub. No.: WO02/100680

PCT Pub. Date: Dec. 19, 2002

(65) Prior Publication Data

US 2004/0155507 A1 Aug. 12, 2004

(30) Foreign Application Priority Data

Jun. 13, 2001 (ES) .......................................... 200101433
Dec. 26, 2001 (ES) .......................................... 200200094

(51) Int. Cl.[7] .................................................. A47C 7/38

(52) U.S. Cl. ....................... 297/397; 297/398; 297/399; 297/400; 297/401; 297/402; 297/406

(58) Field of Search ................................ 297/397, 398, 297/399, 400, 401, 402, 406, 407

(56) References Cited

U.S. PATENT DOCUMENTS 104,473 A * 6/1870 Lyon et al. ................. 297/402
146,907 A * 1/1874 Hills .......................... 297/402
162,784 A * 5/1875 White ........................ 297/402
221,752 A * 11/1879 Taylor ........................ 297/398
223,276 A * 1/1880 Carrick ....................... 297/402
236,212 A * 1/1881 Cartwrght ................... 297/402
242,380 A * 5/1881 Sharp ......................... 297/400
300,232 A * 6/1884 Doren ........................ 297/402
379,987 A * 3/1888 Ryan .......................... 297/402
468,505 A * 2/1892 Magill ........................ 297/398
668,765 A * 2/1901 Beach ........................ 297/400
928,313 A * 7/1909 Lovett .................... 297/402 X
2,460,942 A 2/1949 Marshall
2,492,383 A * 12/1949 Jones ......................... 297/402
2,501,993 A 3/1950 Conradt
2,527,544 A * 10/1950 Goodwin .................... 297/397
2,560,925 A * 7/1951 Brown ................... 297/401 X
2,624,397 A * 1/1953 St Aubin ................ 297/400 X
2,638,152 A * 5/1953 Pulsifer ...................... 297/400
2,642,927 A 6/1953 Rising
2,869,621 A 1/1959 Zukor
3,271,072 A 9/1966 Barker
3,387,886 A * 6/1968 Longo et al. ............... 297/397
4,796,953 A * 1/1989 Pereira ....................... 297/400
5,868,471 A * 2/1999 Graham et al. ............. 297/397
5,967,613 A * 10/1999 McKeever .................. 297/397
6,123,389 A * 9/2000 O'Connor et al. .......... 297/397
6,305,749 B1 * 10/2001 O'Connor et al. .......... 297/397
6,648,416 B2 * 11/2003 O'Connor et al. .......... 297/397

FOREIGN PATENT DOCUMENTS

JP 06225824 A * 8/1994 ................. 297/399
WO WO 02/24031 A1 3/2002

* cited by examiner

*Primary Examiner*—Rodney B White
(74) *Attorney, Agent, or Firm*—Michael Best & Friedrich LLP

(57) ABSTRACT

A portable traveller headrest is provided. The portable traller headrest includes a bar that may be articulated so that it can be folded onto itself, the ends of said bar having transversal holes to fix the bar to a seat with a fixing mechanism that adapts to different thickness of a top edge of various seats and fixes the bar to a backrest of the seats by pressure and at a desired height chosen by the user. Headrest elements, which comprise thin plates made of a rigid material and have a cushioned cover, can be connected, disconnected and rotated in discrete positions relative to the bar . The fixing mechanism is hingedly mounted in holes located on the bar, thereby requiring little space for storing the assembly.

6 Claims, 6 Drawing Sheets

PORTABLE TRAVELLER HEADREST

This application claims the benefit of International Patent Application No. PCT/ES02/00291 filed Jun. 12, 2002, and claims priority of Spanish Application No. P200200094, filed Dec. 12, 2001, and Spanish Applicaton No. P200101433, filed Jun. 13, 2001.

The present invention relates to a portable traveller headrest whose purpose is to provide the user with a support system for the head to prevent its uncontrolled sideways movements, that can be used on any seat and removed at will. This system is fundamentally aimed at users of public transport (planes, ships, trains), waiting rooms and at people who have difficulty in voluntarily controlling their head movements, due to weakness of the cervical muscles.

BACKGROUND TO THE INVENTION

Millions of travellers in public transport, especially in journeys of a determined duration, make use of the time to sleep reclining their head on the seat rest. The shape of this latter only allows the back part of the head to be supported, because of which, after loosing muscular control during sleep, the head is then subject to abrupt sideways movements, or to sustained positioning in non-anatomic postures. In the best of cases the consequence is usually significant discomfort that prevents adequate sleep, including on occasion producing the appearance of cervical lesions.

Some of these seats have an ergonomic design and have a degree of concavity for accommodating the head and lessen its uncontrolled movement during sleep. Some even have "flaps" incorporated, of variable position, adjustable within a certain range of angle, as the user requires. However, a light non-metallic portable system, of reduced dimensions, that the user can quickly and easily be attached and unattached to a wide range of seat backrests, without altering the configuration of these latter, allowing both its fixing at various heights of the backrest, in order to adapt itself to different user heights, and the control of the opening angle of the side headrests to adapt itself to the ergonomic necessities of the user, does not exist.

DESCRIPTION OF THE INVENTION

The portable traveller headrest consists of a device that can easily be positioned and removed by the user of the seat backrest, as well as being readily adjustable to his needs, without altering the shape of the seat.

The portable traveller headrest can be removed and transported in a small-sized holder, thanks to its hinged configuration.

The portable traveller headrest is made up of a support body, two headrest parts, and a double securing mechanism.

The support body, fabricated of light, rigid and resistant material, consists of a narrow bar, of rectangular section with a ribbed configuration. In one of its two sides, at the areas near to each of its ends, said support has a semi-cylindrical projection parallel to the edge of its section, with polygonal axial holes that allows mounting of the side headrest parts in the position required by the user. Likewise the support body has four cylindrical holes perpendicular to its faces, two of them situated between the two semi-cylindrical projections, and the other two between these and the ends of the support bar, the purpose of these latter being to allow the connection of the apparatus entrusted with securing it, by pressure, to seat backrests of different thicknesses. It will be possible to bend this transverse bar at its centre to allow it to be folded about itself, reducing its length. For the installation of the device the support body must make contact with the seat backrest; being transversely oriented to its vertical axis of symmetry and situated at the height of the user's nape.

To secure the system formed by the support element and the two side headrests to the seat backrest the securing mechanism is used.

The securing mechanism consists of four pieces of rectangular section that are mounted forming two identical mechanisms, similar to a inverted and asymmetric U.

Each inverted and asymmetric U-shaped mechanism has five parts. Two parts in the shape of an inverted L, two flat nuts knurled at the sides, and a square-headed bolt. In the larger section of the bigger L-piece there is a longitudinal central slot, that passes through it, and that has an depression in its back face, centred with said slot; in its smaller section, on the upper face, it has two continuous projections lengthwise along its sides, and a threaded stud perpendicular to said face at its end. This face can have projections or bas-reliefs to assist in the securing of the smaller L part. This is narrower than the bigger L part, and has a longitudinal central slot in its upper section, into which the threaded stud of the other part is inserted.

These U-shaped mechanisms are formed by inserting the threaded stud into the bigger L-piece through the slot in the smaller L-piece. Both pieces remain fixed by means of the flat nut with the knurled side; the relative turning of both pieces being prevented thanks to the continuous projections that the big piece has along its length.

Each inverted and asymmetric U-shaped mechanism connects with the support bar by means of a square-headed bolt that, after having been inserted into the slot of the bigger L piece, and having passed through one of the circular holes that the support bar has at its ends, it is bolted with its corresponding nut and blocks the relative movement of the assembly, according to the model of seat backrest where it is wished to install it.

These inverted and asymmetric U-shaped mechanisms, joined to the support bar, fit loosely onto the top of the seat backrest and secure the system to it, when the user, by pressing on the corners of the U-mechanisms, shortens the central sections of said mechanisms, sliding one over the other and locks them by means of the manual pressure on the two knurled flat nuts.

The adjustment of the vertical position of the support piece on the seat backrest is carried out by moving said bar along the longitudinal slots of the longer sections of the bigger L-pieces, and locking its position by manually pressure on the two nuts on the bolts that pass through one of the holes of the support bar and the longitudinal slot of the bigger L-pieces.

The side headrest parts consist of light ribbed narrow plates of rigid material, coated with the coverings necessary to achieve the adequate retention of solid, liquid or gaseous type flexible material placed on the head support surface.

Once the support bar has been secured to the seat backrest using the U-mechanisms, the side headrest parts can be connected and disconnected from it, and can even be made to pivot, thanks to the polygonal shape of one of the two extended sections that one of the edges of the rigid plate has. The rigid plate of the side headrest extends from the upper cylindrical section, that is of greater diameter, through a generatrix. The lower section forms the pivoting part of the side headrest and it has dimensions such that it can be inserted, with minimum looseness, into one of the coaxial polygonal drilled holes passing from the semi-cylindrical projections of the support bar.

BRIEF DESCRIPTION OF THE DRAWINGS

For better understanding a number of drawings are attached, in which is represented, solely by way of example, a practical case of embodiment of the portable traveller headrest, in the European system.

In said drawings

DESCRIPTION OF A PREFERABLE EMBODIMENT

Figure 1:
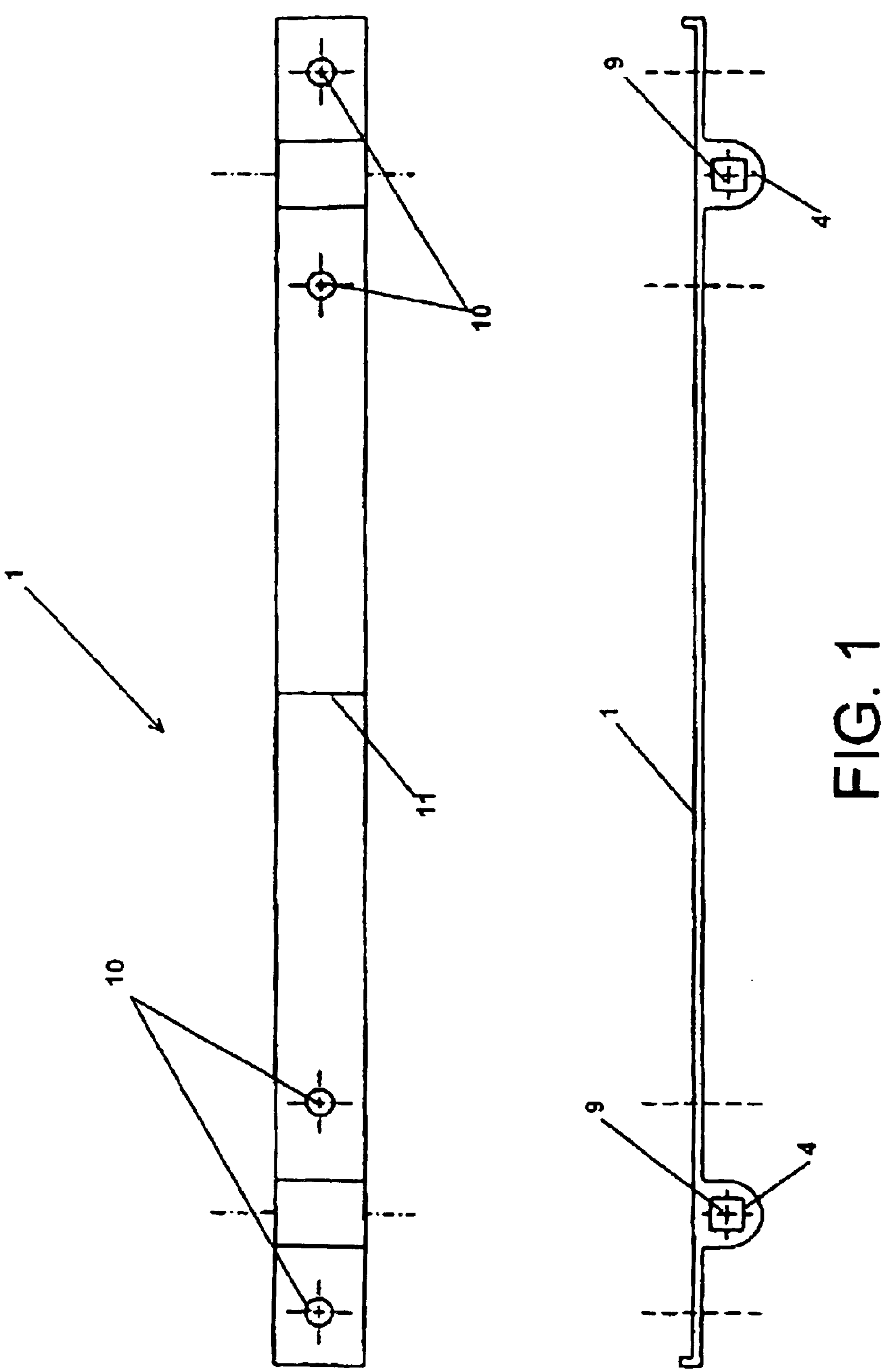
FIG. 1 is an elevation view and an upper view of the support piece, where one possible aspect of the polygonal holes for connecting the side headrest has been shown.
Figure 2:
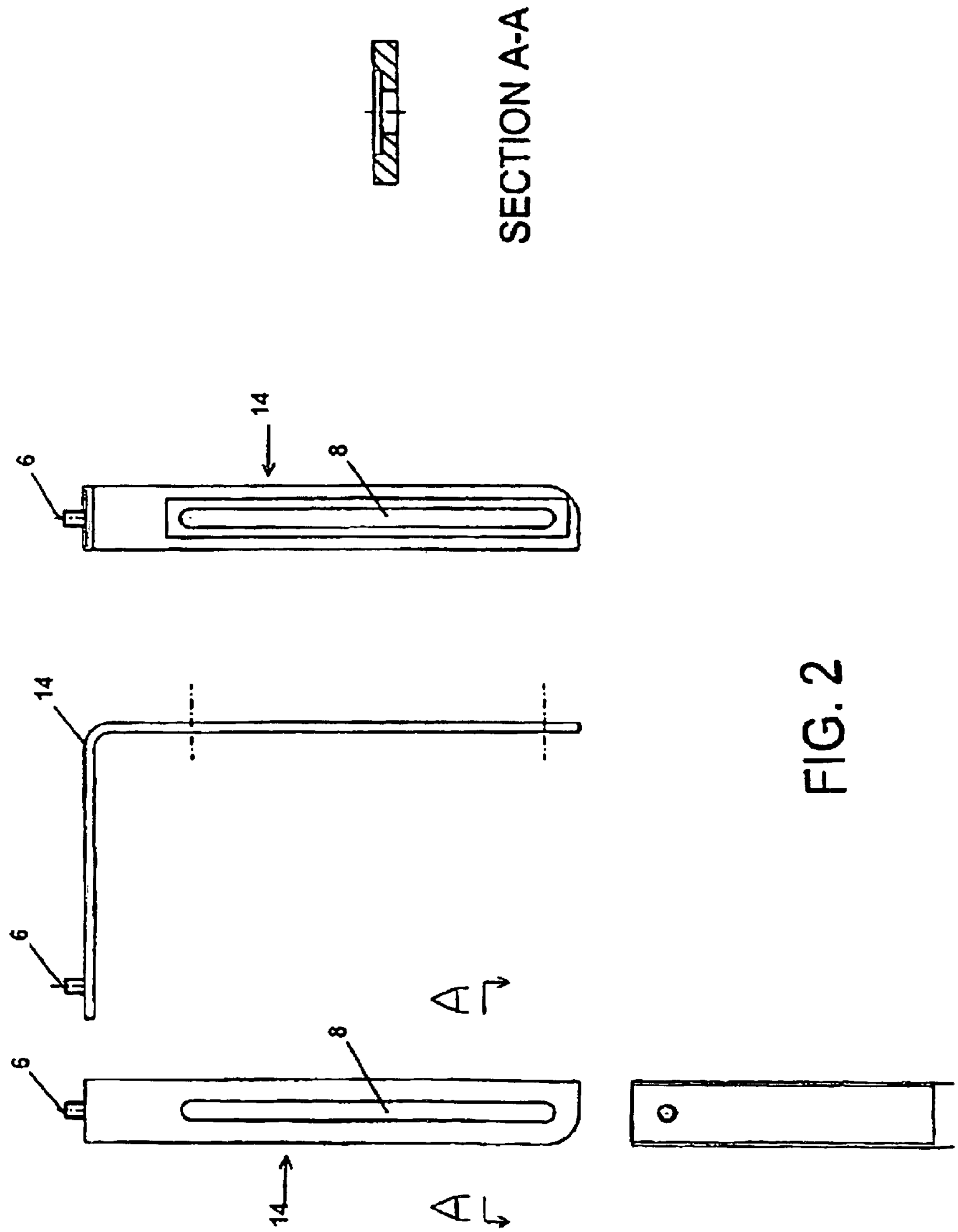
FIG. 2 shows the elevation view, upper view, right side view, and left side view of the larger L-piece of the U-mechanism.
Figure 6:
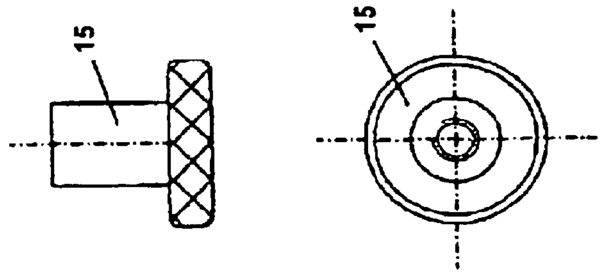
FIG. 6 is the elevation view and the upper view of the bolt that joins the U-mechanisms with the support piece.
Figure 4:
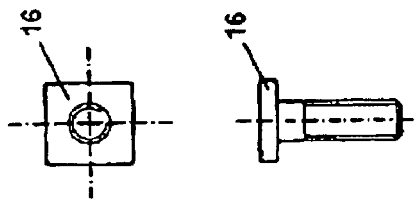
FIG. 4 is the elevation view and the upper view of one of the square-headed bolts that join one of the U-mechanisms with the support piece.
Figure 5:
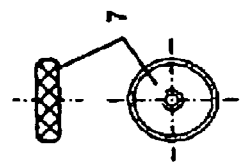
FIG. 5 is the elevation view and the upper view of the knurled bolts for joining the two L-pieces of the securing mechanism.
Figure 3:
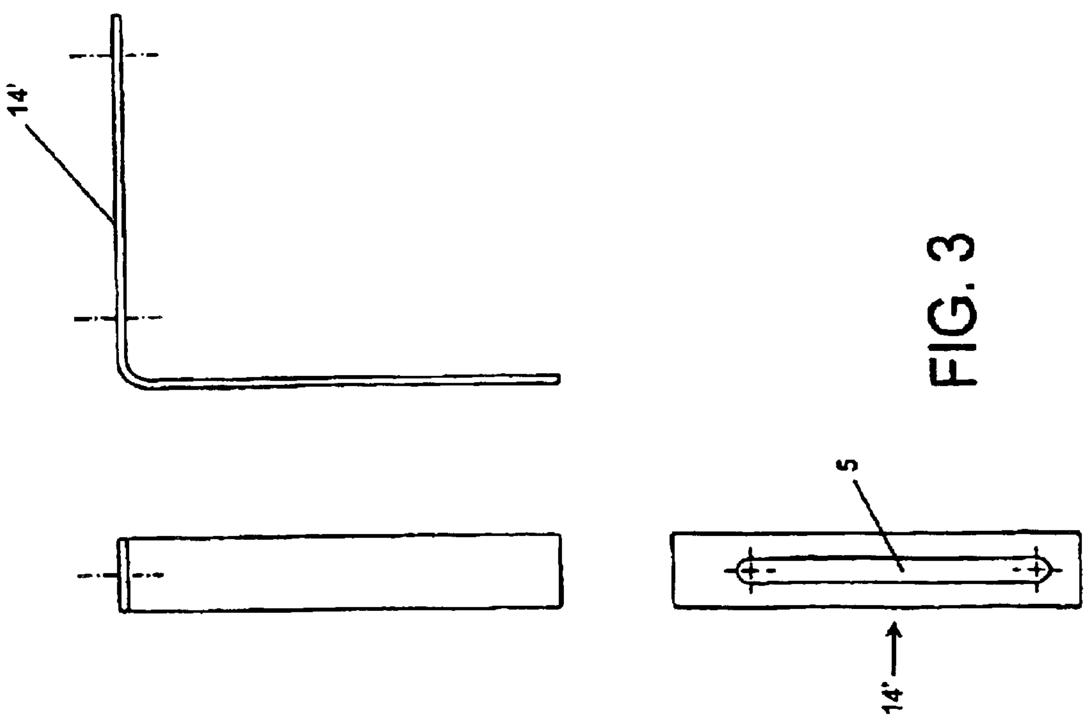
FIG. 3 is the elevation view, left side view and upper view of the smaller L-piece of the U-mechanism.
Figure 7:
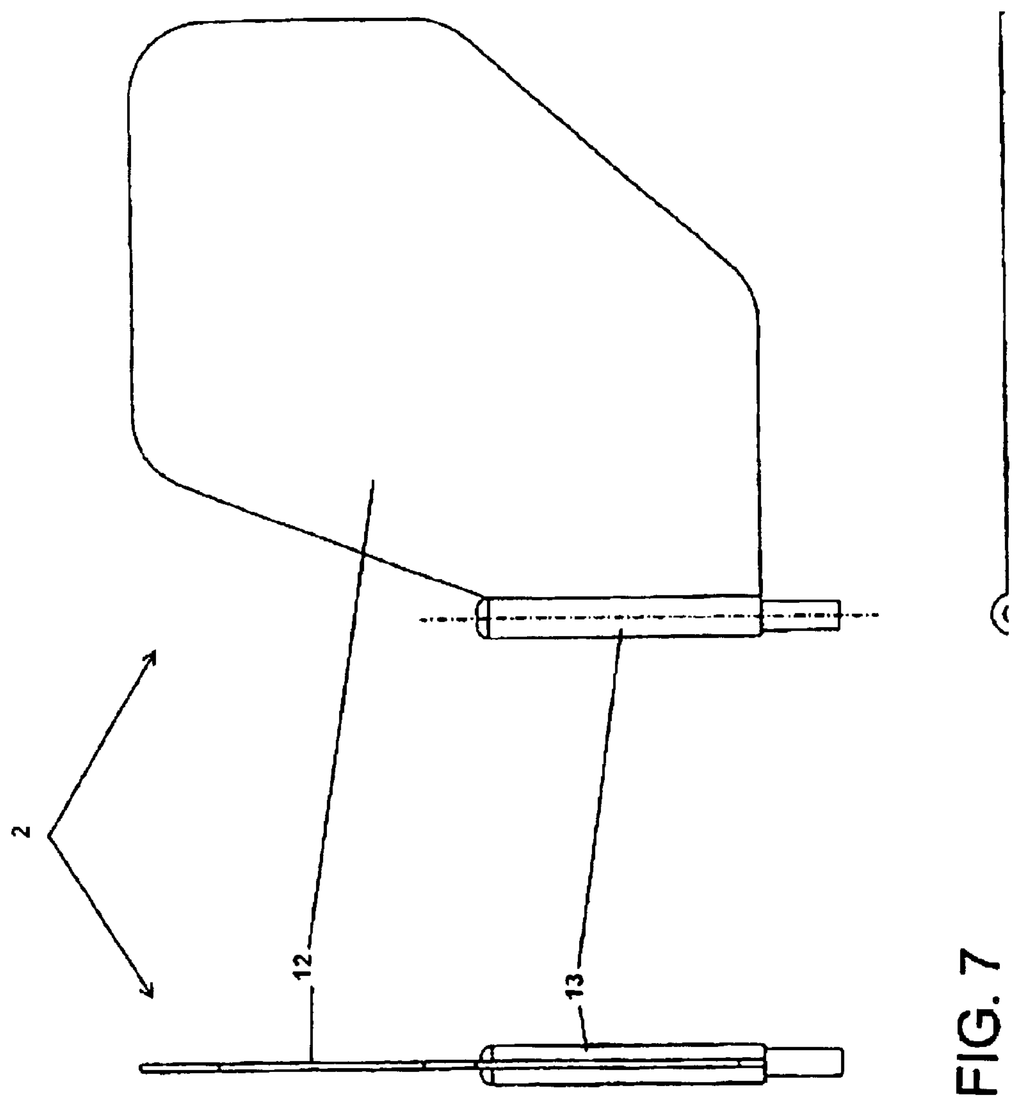
FIG. 7 is the elevation view, right side view and upper view of the pivoting side headrest element.
Figure 8:
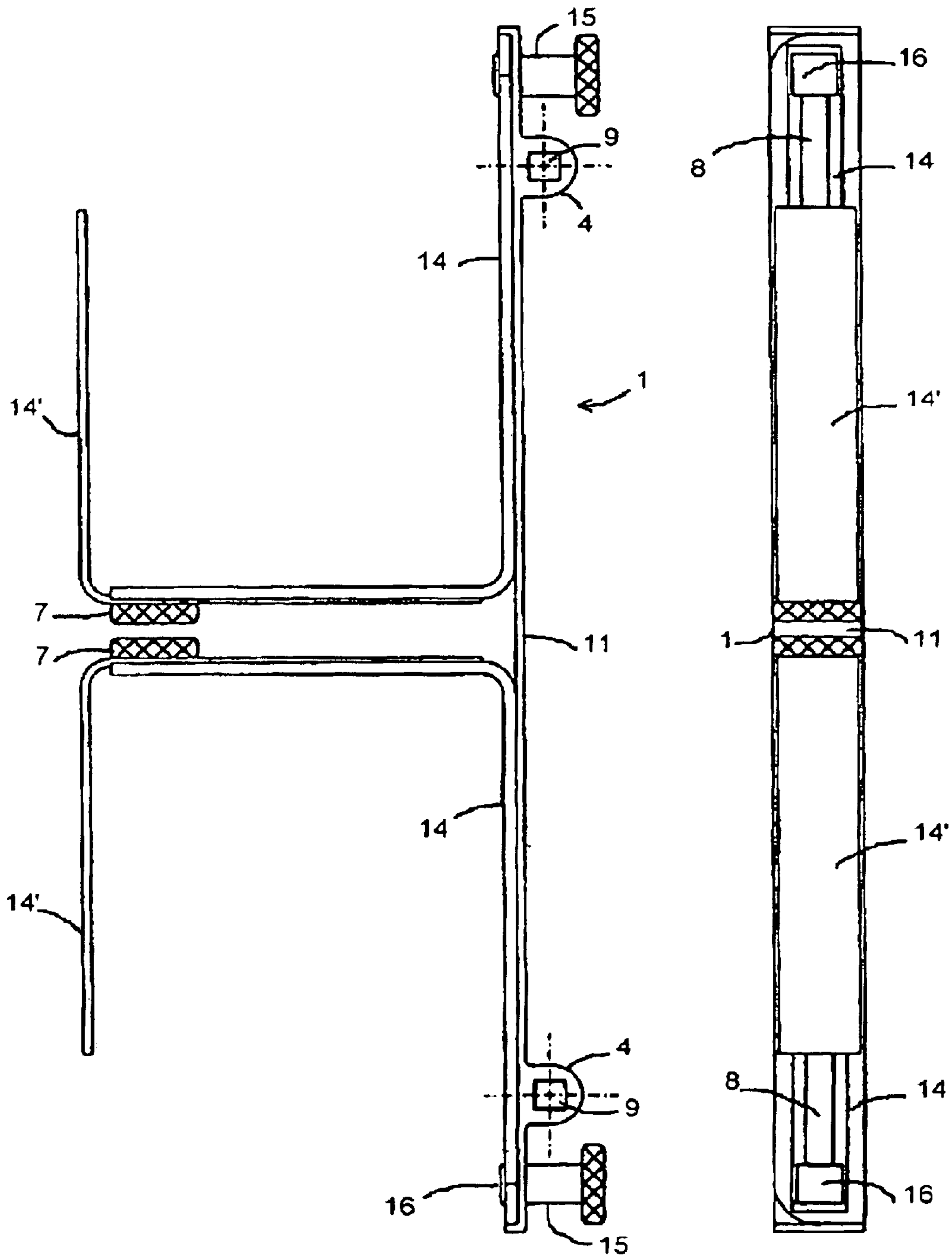
FIG. 8 is an elevation view and an upper view of the portable headrest device in its storage configuration ( without the side headrests), with the U-mechanisms turned at 90 degrees at their joints with the support body, with respect to its mounting configuration.
Figure 9:
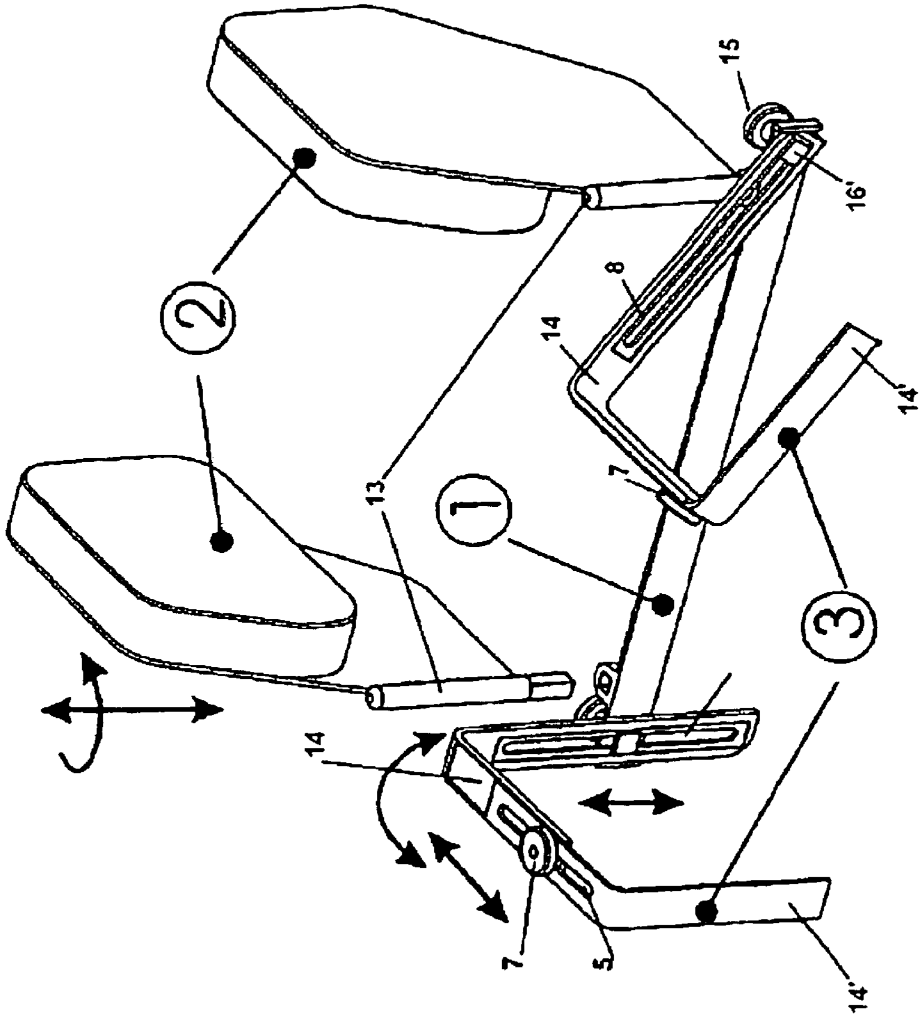
FIG. 9 is a perspective view of the portable traveller headrest in which the various possible movements of the L-pieces that form the U-mechanisms can be seen, and in which a possible way of realization of the head support flexible material has been included.

The portable traveller headrest device in question has a support element, two headrest elements and a securing mechanism, the device formed by ten removable parts; all of them made from material of light specific weight, and with the adequate thickness and ribbing to provide the necessary rigidity. All of the components of the device will have all edges rounded so that they don't entail any danger of cutting, puncturing or punching.

The support element formed by a rectangular section thin bar 1 of ribbed configuration, of resistant, light, non-metallic material, has near to each of its longitudinal ends a semi-cylindrical projection, parallel to the edge of its section, with a polygonal axial perforation 9 therethrough that allows the mounting of the side headrest elements 2 in the angular position required by the user. The support bar 1 has four cylindrical holes 10 perpendicular to its faces, two of them situated between the two semi-cylindrical projections 4 and the other two between each of the semi-cylindrical projections 4 and a proximate end of the support bar 1, their function being to allow the connection of the securing mechanism 3 entrusted with securing the support body 1, by pressure, to seat backrests of different thickness. For installing the device the support bar 1 must be in contact with the seat backrest; its vertical axis of symmetry being transversally oriented and with it placed at the level of the user's nape. The support bar 1 will be divided into two parts joined by a hinge 11 that allows one bar part to be folded over the other in order to reduce a length of the bar 1.

To secure the system formed by the support bar 1 and the two side headrests 2 to the seat backrest, two identical securing mechanisms 3, of inverted and asymmetric U-shape, are used; each of these has five pieces. Two pieces 14, 14' form the inverted L, a knurled edge flat nut 7, a square-headed bolt 16, and a cap nut 15 that has a knurled edge cylindrical end and a smooth cylindrical body of lesser diameter. The larger section of the bigger L-piece 14 has a central longitudinal slot 8 made in it, and in its back face it has a depression centred with said slot; the smaller section has two guides that are continuous along its lengthwise edges on its upper face, and a threaded stud 6 perpendicular to said face at its end. The smaller L-piece 14' of the U-mechanism 3 is narrower than the bigger L-piece 14, in order to seat loosely between the continuous guides along the lengthwise edges on the upper face of the bigger L-piece 14, and it has a central longitudinal slot 5 in one of its sections.

These U-shaped mechanisms 3 are formed by inserting the threaded stud 6 of the bigger L-piece 14 through the slot 5 in the smaller L-piece 14. Both pieces 14, 14' remain secured by means of the knurled side flat nut 7, the relative rotation of both pieces being prevented thanks to the continuous projections that the big piece 14 has along its length.

These inverted asymmetric U-shaped mechanisms connect with the support bar 1 by means of square-headed bolts 16 that, after having been inserted through the longitudinal slots 8 of the bigger L-pieces 14 and passing through two of the cylindrical holes 10 that the support bar 1 has, in its inner part or at its ends, depending on the width of the seat backrest, are bolted with their corresponding nuts 15 and block any relative movement of the assembly formed by the U-mechanisms 3 and the support bar 1.

These inverted asymmetric U-shaped mechanisms 3 fit loosely onto the top of the seat backrest and secure the support bar 1 to the backrest when the user, by pressing on the corners of the U-mechanisms 3, shortens the upper sections of said mechanisms 3, and locks them by manually pressure on the two knurled flat nuts 7.

The adjustment of the vertical position of the support bar 1 on the seat backrest is carried out by moving said bar 1 along the longitudinal slots 8 of the longer sections of the bigger L-pieces 14, and fixing its position by manually pressure on the two nuts 15.

The side headrest elements 2 consist of ribbed thin plates 12 of light rigid material, lined with a covering necessary to achieve the proper retention of the solid, liquid or gaseous type flexible cushioning material placed on a surface of the plate 12.

Once the support bar 1 has been fixed to the seat backrest using the U-mechanisms 3, the side headrest elements 2 can be connected and disconnected to or from the device by sliding, and the headrest elements 2 can even be made to pivot, thanks to the polygonal shape that one of the two extended sections that one of the edges of the rigid plate 12 has. The rigid plate 12 of the side headrest element 2 extends from the cylindrical upper section 13 that is of greater diameter. The lower section forms the pivoting part of the side headrest element 2 and it has dimensions such that it can be inserted, with minimal looseness, into one of the coaxial polygonal holes 9 drilled through the semi-cylindrical projections 4 of the support bar 1.

What is claimed is:

1. A portable traveller headrest device with a light-weight structure, made of low specific weight non-metallic material, that can be adapted by the user for seat backrests having various heights and thicknesses without altering the shape of the seats to which it fits, the device comprising:

a ribbed support bar including two pieces joined by a hinge that permits the pieces to be folded together thereby reducing a length of the bar to facilitate storage and transportation of the device, the pieces having a narrow rectangular cross-section and including two semi-cylindrical projections with polygonal holes proximate to lengthwise ends of the bar; and two side headrest elements adapted to couple with the polygonal holes and adjustable to an angular position selectable by the user.

2. A portable traveller headrest, according to claim 1, wherein the side headrest elements comprise:

two light-weight rigid thin plates;

a cushioned cover disposed on a side of each of the plates; and a pivot for adjusting the plate to an angle, with respect to a backrest surface.

3. A portable traveller headrest, according to claim 2, further comprising two inverted U-shaped mechanisms that are each adapted to couple with a cylindrical hole disposed on the pieces proximate each of the semi-cylindrical projections so that the mechanisms depend rearward from the bar to hook over a seat backrest, each mechanism comprising two independent L-shaped pieces that slide over each other allowing a width of the U-shaped mechanism to be increased or diminished, thus adapting itself to seats of different thicknesses.

4. A portable traveller headrest, according to claim 3, wherein a vertical portion of the L-shaped piece coupled with the bar includes a longitudinal slot that allows vertical adjustment of the bar relative to a horizontal portion of the U-shaped mechanism.

5. A portable traveller headrest, according to claim 1, further comprising: two inverted U-shaped mechanisms that are each adapted to couple with a cylindrical hole disposed on the pieces proximate each of the semi-cylindrical projections so that the mechanisms depend rearward from the bar to hook over a seat backrest, each mechanism comprising two independent L-shaped pieces that slide over each other allowing a width of the U-shaped mechanism to be increased or diminished, thus adapting itself to seats of different thickness.

6. A portable traveller headrest according to claim 5, wherein a vertical portion of the L-shaped piece coupled with the bar includes a longitudinal slot that allows vertical adjustment of the bar relative to a horizontal portion of the U-shaped mechanism.

* * * * *